US011625193B2

United States Patent
Lim et al.

(10) Patent No.: US 11,625,193 B2
(45) Date of Patent: Apr. 11, 2023

(54) RAID STORAGE DEVICE, HOST, AND RAID SYSTEM

(71) Applicant: SAMSUNG ELECTRONICS CO., LTD., Suwon-si (KR)

(72) Inventors: Jae Hwan Lim, Seongnam-si (KR); Seung-Woo Lim, Hwaseong-si (KR); Sung-Wook Kim, Suwon-si (KR); So-Geum Kim, Hwaseong-si (KR); Jae Eun Kim, Yongin-si (KR); Dae Hun You, Seoul (KR); Walter Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/351,506

(22) Filed: Jun. 18, 2021

(65) Prior Publication Data

US 2022/0011979 A1   Jan. 13, 2022

(30) Foreign Application Priority Data

Jul. 10, 2020 (KR) ........................ 10-2020-0085103

(51) Int. Cl.
*G06F 3/06* (2006.01)
(52) U.S. Cl.
CPC .......... *G06F 3/0659* (2013.01); *G06F 3/0604* (2013.01); *G06F 3/0689* (2013.01)
(58) Field of Classification Search
CPC ................................ G06F 3/06; G06F 3/0689
See application file for complete search history.

(56) References Cited

U.S. PATENT DOCUMENTS

| 8,209,587 | B1 | 6/2012 | Taylor et al. |
| 9,164,838 | B2 | 10/2015 | Daikokuya et al. |
| 10,241,877 | B2 | 3/2019 | Camp et al. |
| 10,289,500 | B2 | 5/2019 | Hands |
| 10,430,278 | B2 | 10/2019 | Lee |
| 10,459,807 | B2 | 10/2019 | Hutchison et al. |

(Continued)

OTHER PUBLICATIONS

Linjun Mei et al., "A High-Performance and High-Reliability RAIS5 Storage Architecture With Adaptive Strip," Dec. 7, 2018, Advances in Dataases and Information Systems; Lecture Notes in Computer Science; Springer International Publishing, CAM. pp. 562-577.

(Continued)

*Primary Examiner* — Stephanie Wu
(74) *Attorney, Agent, or Firm* — Volentine, Whitt & Francos, PLLC (57) ABSTRACT

A redundant array of independent disks (RAID) storage device including; a memory device including first memory devices configured to store at least one of data chunks and corresponding parity (data chunks/parity) and a second memory device configured to serve as a spare memory region, and a RAID controller including a RAID internal memory configured to store a count table and configured to control performing of a rebuild operation in response to a command received from a host, wherein upon identification of a failed first memory device, the RAID controller accesses used regions of non-failed first memory devices based on the count table and rebuilds data of the failed first memory device using the second memory device.

15 Claims, 9 Drawing Sheets

(56) References Cited

U.S. PATENT DOCUMENTS

| | | | |
|---|---|---|---|
| 2009/0222625 A1* | 9/2009 | Ghosh | G06F 12/0802 |
| | | | 711/3 |
| 2009/0271659 A1 | 10/2009 | Troppens et al. | |
| 2011/0283047 A1* | 11/2011 | Cho | G06F 3/0659 |
| | | | 711/E12.001 |
| 2014/0337578 A1 | 11/2014 | Bert | |
| 2017/0212814 A1* | 7/2017 | Hands | G06F 11/2082 |
| 2017/0220295 A1* | 8/2017 | Khan | G06F 3/0608 |
| 2017/0300393 A1* | 10/2017 | Sreedhar M | G06F 11/1076 |
| 2019/0317889 A1* | 10/2019 | Chang | G06F 3/064 |

OTHER PUBLICATIONS

EPO Search Report dated Oct. 22, 2021, Cited in Application No. 211164507.2-1224.

* cited by examiner

| x=LBA | f1(x)=x%10 | f2(x)=f1(x)+x%3 | f3(x)=f2(x)+x%7 | f4(x)=f3(x)+2 |
|---|---|---|---|---|
| 11 | 1 | 3 | 7 | 9 |
| 34 | 4 | 5 | 11 | 13 |
| 242 | 2 | 4 | 8 | 10 |
| 167 | 7 | 9 | 15 | 17 |
| 24 | 4 | 4 | 7 | 9 |
| 47 | 7 | 9 | 14 | 16 |
| 96 | 6 | 6 | 11 | 13 |
| 100 | 0 | 1 | 3 | 5 |

| [0] | [1] | [2] | [3] | [4] | [5] | [6] | [7] | [8] | [9] | [10] | [11] | [12] | [13] | [14] | [15] | [16] | [17] |
|---|---|---|---|---|---|---|---|---|---|---|---|---|---|---|---|---|---|
| 1 | 2 | 1 | 2 | 4 | 2 | 2 | 4 | 1 | 4 | 1 | 2 | 0 | 2 | 1 | 1 | 1 | 1 |

RAID STORAGE DEVICE, HOST, AND RAID SYSTEM

This application claims the benefit of Korean Patent Application No. 10-2020-0085103 filed on Jul. 10, 2020 in the Korean Intellectual Property Office, the subject matter of which is hereby incorporated by reference.

BACKGROUND

1. Field

The inventive concept relates generally to redundant array of independent disks (RAID) storage devices, hosts operating with RAIN storage devices and RAID systems.

2. Description of the Related Art

RAID systems and RAID methods are commonly used in storage media such as servers storing important data. Various configurations are possible such as a method of simply distributing data across storage media during the input/output of data or the copying/storing of data. In addition to payload data, RAID systems and RAID methods may also store parity information (hereafter, 'parity') in one or more of the storage media storing data. Thus, should an error occur in the stored data (whether stored across the storage media or another storage medium), it may be appropriately restored. As a result, a RAID may increase data stability by preventing data loss and balance input/output (I/O) operations, thereby improving overall server performance.

As will be appreciated by those skilled in the art, a number of RAID configurations are widely used. For example, in a so-called RAID level 5 or RAID level 6 system, data is distributed and stored across storage media and parity bits are used in the systems to ensure data integrity. That is, in RAID level 5, one parity bit per data chunk is distributed and stored, and in RAID level 6, two parity bits per data chunk are distributed and stored. However, when a RAID level 5 or RAID level 6 system is used, since it includes one or two spare storage regions, a rebuild process must be performed on a corresponding spare storage region when a data failure occurs.

Here, the rebuild process may generate lost data by accessing parity bits and data included across the entire RAID system. Accordingly, the rebuild process requires considerable time and may significantly influence the overall I/O performance of the RAID system due to the use of system resources during the rebuild process.

SUMMARY

Embodiments of the inventive concept provide redundant array of independent disks (RAID) storage devices, host devices and RAID systems capable of reducing the execution time for a rebuild process, and reducing the overall number of input/output (I/O) required for the rebuild operation by accessing and rebuilding data only in an actually used region.

However, the inventive concept is not restricted to only these outcomes, and other aspects of the inventive concept will become more apparent to those skilled in the art upon consideration of the following detailed description and accompanying drawings.

According to an aspect of the inventive concept, there is provided a redundant array of independent disks (RAID) storage device including; a memory device including first memory devices configured to store at least one of data chunks and corresponding parity (data chunks/parity) and a second memory device configured to serve as a spare memory region, and a RAID controller including a RAID internal memory configured to store a count table and configured to control performing of a rebuild operation in response to a command received from a host, wherein upon identification of a failed first memory device, the RAID controller accesses used regions of non-failed first memory devices based on the count table and rebuilds data of the failed first memory device using the second memory device.

According to an aspect of the inventive concept, there is provided a host device connected to nonvolatile memory devices including first memory devices configured to store at least one of data chunks and corresponding parity (data chunks/parity), and a second memory device configured to serve as a spare memory region. The host device includes; a host internal memory configured to store a count table indicating used regions of each of the first memory devices, and a host processing unit configured to control a redundant array of independent disks (RAID) operation on the first memory devices and update the count table in response to the RAID operation, and further configured to control a rebuild operation on a failed first memory device among the first memory devices using the second memory device.

According to an aspect of the inventive concept, there is provided a redundant array of independent disks (RAID) system including a host and solid state drives (SSDs) connected to the host. Each one of the SSDs may include; first memory devices configured as a RAID and further configured to store at least one of data and corresponding parity (data/parity), a second memory device configured to serve as a spare memory device, and a memory controller configured to performs data access operations on the first memory device and the second memory device. The RAID system storing a count table indicating used regions for each of the first memory devices, and upon identifying a failed first memory device, the RAID system accesses data/parity in only used regions of non-failed first memory devices by referencing the count table to perform a rebuild operation on the failed first device using the second memory device.

According to an aspect of the inventive concept, there is provided a redundant array of independent disks (RAID) control module connected to a plurality of SSDs which operate according to RAID level 5 or RAID level 6, wherein when performing a rebuild operation on at least one second SSD because at least any one first SSD among the SSDs fails, the RAID control module accesses only used regions of the other first SSDs and performs the rebuild operation on the second SSD.

BRIEF DESCRIPTION OF THE DRAWINGS

Certain embodiments of the inventive concept are illustrated, wholly or in relevant part, in the accompanying drawings.

DETAILED DESCRIPTION

In the written description that follows, terms such as "unit" or "module" denote one or more functional block(s), some of which may be illustrated in the accompanying drawings, that may be implemented in hardware, software or a combination of hardware/software, and that may be variously configured to perform one or more function(s).

Exemplary redundant array of independent disks (RAID) systems according to embodiments of the inventive concept will now be described with reference to FIGS. 1 through 15.

Figure 1:
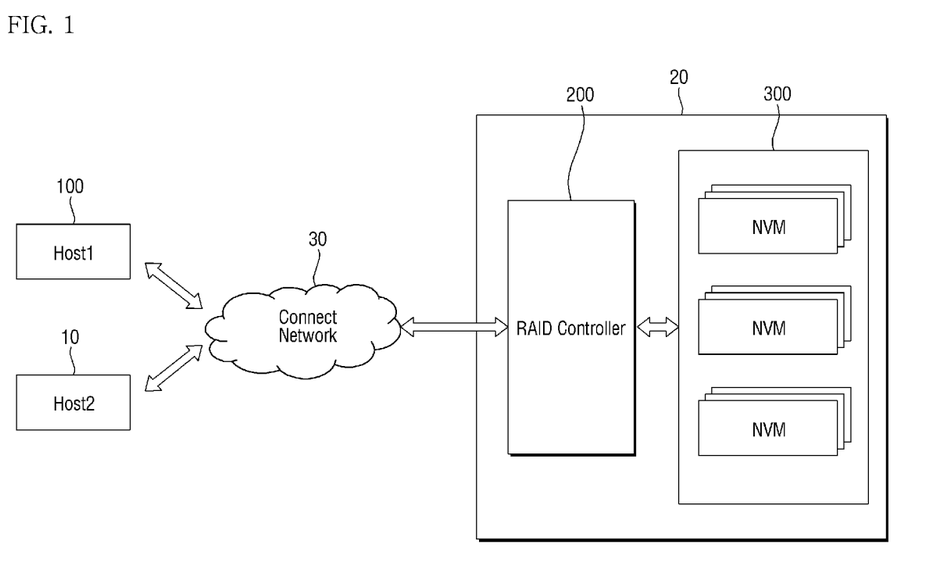
FIG. 1 is a block diagram of a RAID system 20 according to embodiments of the inventive concept.
Figure 2:
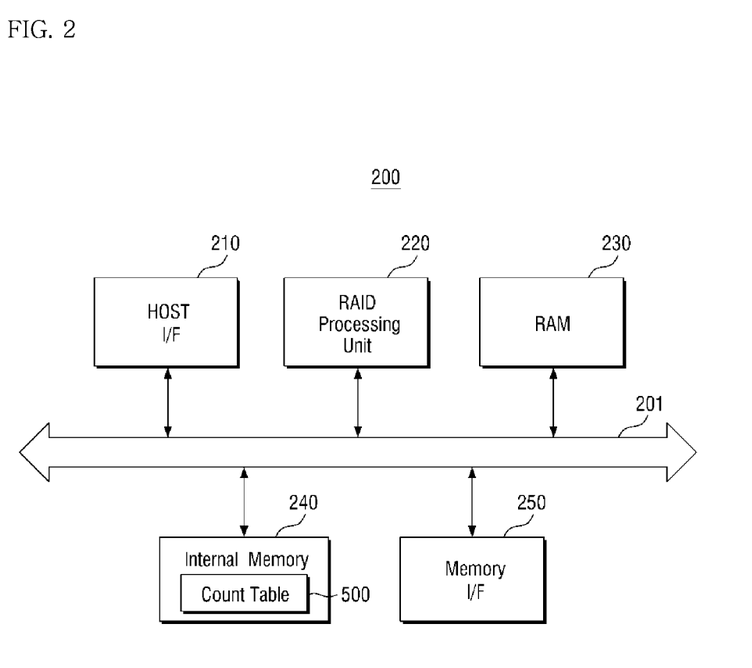
FIG. 2 is a block diagram further illustrating in one example the RAID controller 200 of FIG. 1.

FIG. 1 is a block diagram illustrating a RAID system 20 according to embodiments of the inventive concept, and FIG. 2 is a block diagram further illustrating in one example the RAID controller 200 of FIG. 1.

Referring to FIGS. 1 and 2, the RAID system 20 may generally include the RAID controller 200 and memory devices 300 connected to one or more hosts (e.g., hosts 100 and 10) via a connect network 30.

Here, the memory devices 300 may include nonvolatile memory devices, wherein respective nonvolatile memory devices communicate with the RAID controller 200 through at least one channel among a plurality of channels. In some embodiments, the memory devices 300 may include nonvolatile semiconductor memory devices (e.g., NAND flash memory devices) and/or one or more solid state drive(s) (SSD).

In some embodiments, the memory devices 300 may include first memory device(s) that store data chunks and at least one parity corresponding to the data chunks, as well as second memory device(s) that provide a spare memory region.

The RAID controller 200 may be implemented as a separate hardware card to manage the memory devices 300 as hardware, and/or as a chipset to manage the memory devices 300 as firmware.

In the illustrated example of FIG. 1, the RAID controller 200 is connected between a first host 100 and a second host 10, and the memory devices 300. The RAID controller 200 may be configured to access the memory devices 300 in response to requests from the hosts 100 and 10. For example, the RAID controller 200 may be configured to control various data access operation (e.g., data read, data write, and data discard operations) performed by the memory devices 300. In this regard, the one or more data access operations may be referred to as a RAID operation, wherein the memory devices 300 may be controller to perform various RAID operations during foreground and/or background operating modes. Hence, in some embodiments, a rebuild operation may be performed as a foreground operation or as a background operation.

Although specifically illustrated in FIG. 1, the RAID controller 200 may be configured to provide an interface between the memory devices 300 and the first host 100. In addition, the RAID controller 200 may be configured to drive firmware for controlling the memory devices 300.

Referring to FIG. 2, the RAID controller 200 may further include, in relevant part, a host interface 210, a RAID processing unit 220, a random access memory (RAM) 230, an internal memory 240 and a memory interface 250.

The host interface 210 may facilitate the use of one or more protocol(s) for data exchange between the first host 100 and the RAID controller 200. For example, the RAID controller 200 may be configured to communicate with a host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, a serial attached SCSI (SAS) protocol, an enhanced small disk interface (ESDI) protocol, and an integrated drive electronics (IDE) protocol.

The RAID processing unit 220 may be used to control the overall operation of the RAID controller 200. In some embodiments, the RAID processing unit 220 may perform a RAID operation or a background operation on the memory devices 300.

The RAM 230 may be used as a working memory for the RAID controller 200 and may be implemented using various types of volatile and/or nonvolatile memory. For example, the RAM 230 may be implemented using at least one of a dynamic RAM (DRAM), a static RAM (SRAM), a phase-change RAM (PRAM), a magnetic RAM (MRAM), a resistive RAM (RRAM) and a flash memory.

The internal memory 240 may be used as a buffer memory. In some embodiments, the internal memory 240 may include a read only memory (ROM), a programmable read only memory (PROM), an erasable PROM (EPROM), an electrically erasable programmable read only memory (EEPROM), a PRAM, a flash memory, an SRAM, or a DRAM. The memory 240 may store preset information, programs, or commands related to the operation or state of the RAID controller 200.

Figure 5:
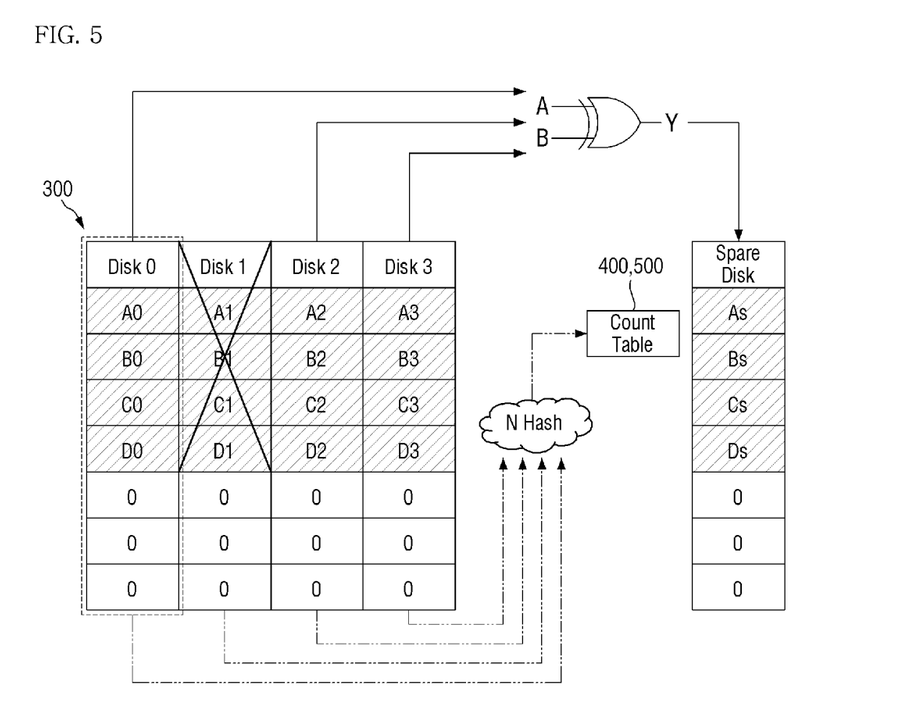
FIG. 5 is a conceptual diagram illustrating a rebuild operation that may be performed by a RAID control module according to embodiments of the inventive concept.

The internal memory 240 may also include a count table 500 associated with certain embodiments of the inventive concept, one example of which is described in relation to FIG. 5 hereafter.

The RAID controller 200 may be used to control the performing (or execution) of a RAID rebuild operation on the memory devices 300. For example, the RAID controller 200 may perform a RAID rebuild operation on the memory devices 300 on a stripe-by-stripe basis. Example of possible rebuild operations performed on the memory devices 300 by the RAID controller 200 will be described hereafter in some additional detail.

The memory interface 250 may include a protocol for data exchange between the memory devices 300 and the RAID controller 200.

In some embodiments, the RAID controller 200 and the memory devices 300 may be integrated into a single semiconductor device, such as (e.g.,) a memory card functioning as a SSD. When the RAID controller 200 and the memory devices 300 are integrated into a single semiconductor device used as an SSD, the operating speed of a host connected to the RAID system 20 may be markedly improved. However, the inventive concept is not limited thereto, and the RAID controller 200 and the memory devices 300 may alternately be implemented as physically separate (e.g., mechanically attachable/detachable) components.

Here, in embodiments wherein the RAID controller 200 and the memory devices 300 are integrated into a memory card, the memory card may be configured to operate as a personal computer (PC) card (Personal Computer Memory Card International Association (PCMCIA)), a compact flash (CF) card, a smart media card (SM or SMC), a memory stick, a multimedia card (MMC, RS-MMC or MMCmicro), an SD card (SD, miniSD, microSD or SDHC), or a universal flash storage (UFS).

In should be further noted that the memory devices 300 may be variously packaged using one or more techniques, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flatpack package (TQFP), small outline integrated circuit (SOIC), shrink small outline package (SSOP), thin small outline package (TSOP), thin quad flatpack package (TQFP), system in package (SIP), multi-chip package (MCP), wafer-level fabricated package (WFP), and wafer-level processed stack package (WSP).

Figure 3:
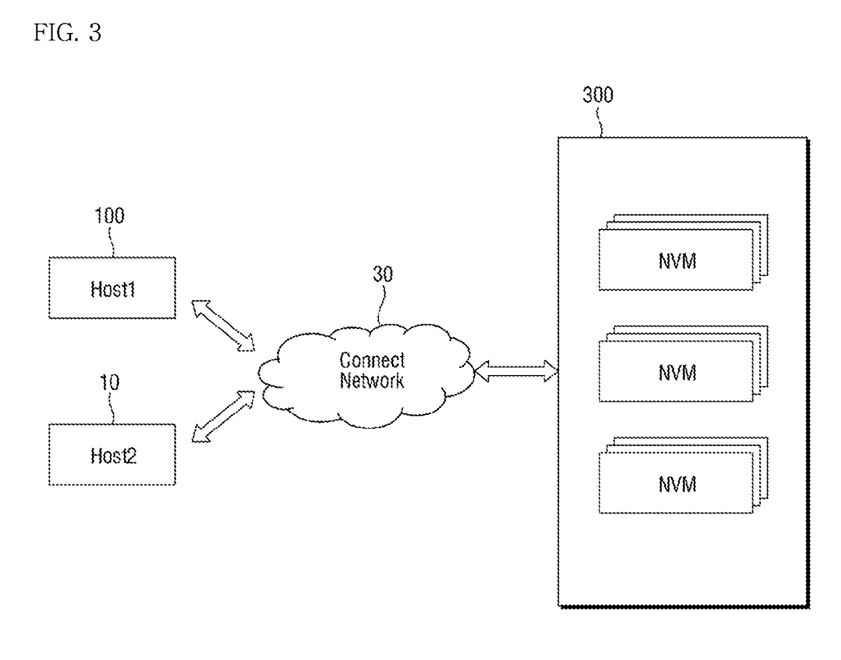
FIG. 3 is a block diagram illustrating a RAID system according to embodiments of the inventive concept.
Figure 4:
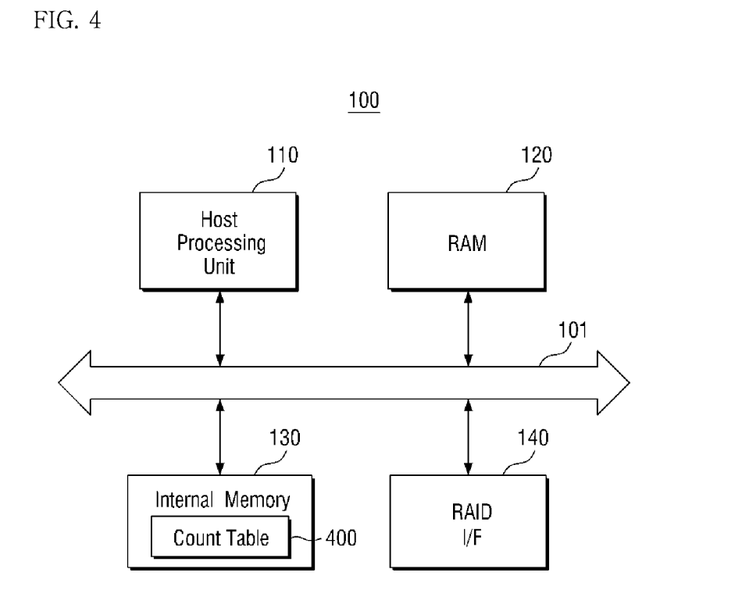
FIG. 4 is a block diagram further illustrating in one example the host device 100 of FIG. 1.

FIG. 3 is a block diagram illustrating another RAID system according to embodiments of the inventive concept, and FIG. 4 is a block diagram further illustrating in one example the host device 100 of FIGS. 1 and 3.

Here, the RAID system of FIG. 3 does not include a RAID controller, like the RAID controller 200 of FIGS. 1 and 2. Instead, the RAID system of FIG. 3 includes the first host 100 and the second host 10 connected to memory devices 300 via the connect network 30, wherein at least one of the nonvolatile memory devices 300 stores RAID software. That is, the host device 100 may build at least one of the nonvolatile memory devices 300 as a RAID by executing software booted by an operating system (e.g., upon power-up of the RAID system).

For example, referring to FIG. 4, the first host device 100 may include a host processing unit 110, a RAM 120, an internal memory 130 and a RAID interface 140.

The host processing unit 110 may be used to control the overall operation of the host 100. For example, the first host 100 may perform a RAID operation or a rebuild operation on the memory devices 300.

The RAM 120 may be used as a working memory for the first host device 100 and may be variously implemented using volatile memory and/or nonvolatile memory as previously described.

The internal memory 130 may be used as a buffer memory, and may be variously implemented using a cache, a ROM, a PROM, an EPROM, an EEPROM, a PRAM, a flash memory, an SRAM and/or a DRAM. In some embodiments, the memory 130 may store preset information, programs, commands, etc., related to the operation or an operating state of the first host device 100.

In some embodiments, the internal memory 130 may include a count table 400 according to embodiments of the inventive concept. (See, e.g., FIG. 5).

The RAID interface 140 may enable a protocol that facilitates the exchange of data between the memory devices 300 and the first host 100.

In the written description that follows, a RAID control module will be described. The RAID control module may be the RAID controller 200 described in in relation to FIGS. 1 and 2 or it may be the first host device 100 described in relation to FIGS. 3 and 4.

FIG. 5 is a conceptual diagram illustrating a rebuild operation that may be performed by a RAID control module according to embodiments of the inventive concept.

In the illustrative example, memory devices 300 are assumed to include a first memory device Disk 0, a second memory device Disk 1, a third memory device Disk 2, and a fourth memory device Disk 3 (collectively "Disk 0 through Disk 3"), each respectively configured as a first memory device to store data chunks and parity, as well as a Spare Disk configured as a second memory device to provide spare memory space. It is further assumed that a data access operation directed to the second memory devices Disk 1 (a first memory device) has failed. Accordingly, the RAID system according to the embodiments of the inventive concept will rebuild data stored on the failed memory device (i.e., Disk 1) using the Spare Disk.

However, those skilled in the art will recognize that the number of first memory devices storing data and/or parity and the number of second memory devices providing spare memory space may vary by RAID system design.

In some embodiments, P parity may be stored in relation to data stored in the first memory devices, and Q parity (additional to the P parity) may also be stored in relation to data stored in the first memory devices. However, Q parity may be parity generated in a different way than P parity.

In some embodiments, the first memory devices (Disk 0 through Disk 3) included in the RAID system may include so-called "stripes" respectively distinguished as rows. Each stripe may include a plurality of data chunks and one or two parities corresponding to the stored data chunks belonging to the same stripe. The parities may be, for example, parities generated by performing an XOR operation on the data chunks belonging to the same stripe.

In the illustrated embodiment of FIG. 5, three (3) data chunks and one parity are assumed for illustrative purposes, wherein the data chunks and parity are respectively indicated by A through D without distinction.

As noted above, a second memory device (Spare Disk) has previously been allocated a spare region before the rebuild operation is performed. Thus, the Spare Disk may, wholly or in part, an empty data region before the rebuild operation.

In some embodiments, wherein the memory devices 300 are integrated into a single semiconductor device as described above, the first memory devices and the second memory device may be implemented using memory cells provided by a semiconductor package.

Once the failed first memory device (Disk 1) is identified, a rebuild operation may be performed, wherein the rebuild operation is performed by the RAID controller 200 of FIG. 1 or the host device 100 of FIG. 3.

In some more specific embodiments, an XOR operation may be performed on a stripe by strip basis for the non-failed, first memory devices (e.g., Disk 0, Disk 2 and Disk 3), and the results of the XOR operations may be stored in the second memory device (Spare Disk). Thus, during the rebuild operation, an XOR operation may be performed on A0, A2 and A3 stored in respective first rows of the non-failed, first memory devices (Disk 0, Disk 2 and Disk 3), and a value of As obtained by performing the XOR operation may be stored in a first row of the second memory device (Spare Disk).

However, when data chunks are stored in only part(s) of each one of the first memory devices (Disk 0 through Disk 3 in the illustrated example of FIG. 5, including first through fourth rows), it may be difficult for the RAID controller 200 of FIG. 1 or the host device 100 of FIG. 3 to identify (or differentiate) "used region(s)" from "unused region(s)" for each of the first memory devices (Disk 0 through Disk 3).

In this regard, the count table 400 or 500 may be used to store information associated with used region of a first memory device. For example, in some embodiments, the count table 400 or 500 may be implemented using a Bloom filter method, wherein a data structure is used to check whether a data chunk exists in a memory device. If it is determined that a data chunk exists in a specific region of a memory device according to the Bloom filter method, there may occur a false positive in which the data chunk does not actually exist, but never occurs a false negative in which it is determined, on the contrary, that the data chunk does not exist in the specific region of the memory device although the data chunk exists. That is, there is no risk of missing a data chunk when the used region of the memory device is checked.

Accordingly, the RAID controller 200 of FIG. 1 or the host device 100 of FIG. 3 may be used to identify used region(s) of a first memory device by checking a corresponding count table 400 or 500, and may accesses only the identified used region, thereby reducing the time required to perform a rebuild operation, as compared with approaches that require accessing the entire first memory device during the rebuild operation. In addition to reducing rebuild time, the number of I/O operations that must be performed during the rebuild operation may be reduced, thereby improving overall performance of the RAID system.

In some embodiments, the count table 400 or 500 may include "buckets," wherein buckets may be implemented as an array of one row, and each row of buckets may be a position corresponding to a used region of a first memory device.

Thus, the count table 400 or 500 may generate a hash value by performing hash modulation at least one based on a logical block address (LBA) at which data chunks or at least one parity are stored in each of the first memory devices Disk 0 through Disk 3 and may store a count in a bucket corresponding to the hash value in the count table 400 or 500. This exemplary approach will be described in some additional detail with respect to FIG. 8.

Figure 6:
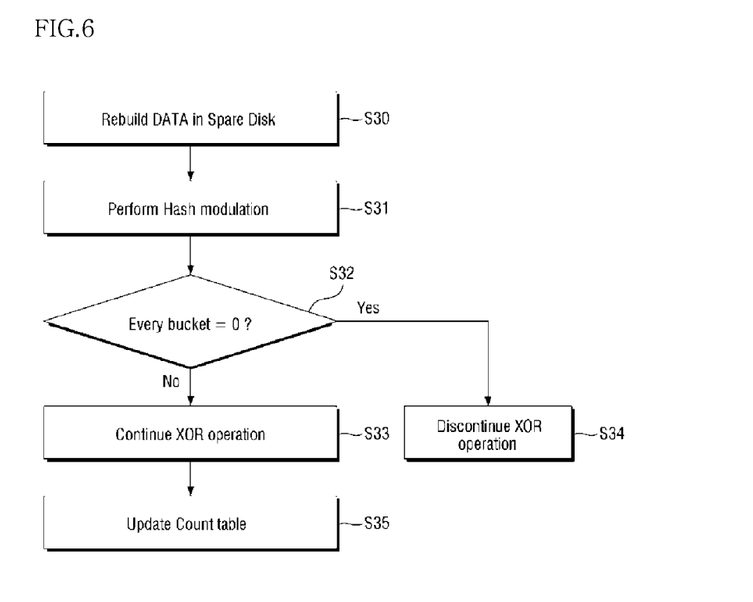
FIG. 6 is a flowchart summarizing in one example a rebuild operation that may be performed by a RAID system according to embodiments of the inventive concept.

FIG. 6 is a flowchart summarizing in one example a rebuild operation that may be performed by a RAID system according to embodiments of the inventive concept. (Here, the same exemplary RAID system of FIG. 5 is assumed for descriptive purposes).

Accordingly, a RAID control module may rebuild data for a failed first memory device (Disk 1) in a second memory device (Spare Disk) (S30).

To rebuild the data, the RAID control module may perform a hash modulation based on LBAs of used regions for the non-failed, first memory devices (Disk0, Disk 2 and Disk 3) (S31). In some embodiments, the hash modulation may be performed multiple times using different types of hash functions. In some embodiments, the number of times the hash modulation is performed may be further increased to produce different hash values that are not redundant. An exemplary approach will be described in some additional detail with respect to FIG. 7.

Thus, the RAID control module may begin a rebuild process when one of the first memory devices 300 fails (S30) using a hash modulation performed based on LBA(s) associated with each of the first memory devices 300 (S31). Then, if values of all buckets corresponding to the LBA are zero (S32=YES), the LBA is excluded from an XOR operation (S34) because it is an LBA to which data has never been previously written. However, if the values of all buckets corresponding to the LBA are not zero in a count table 400 or 500 (S32=NO) as a result of performing the hash modulation based on the LBA in operation S31, a determination may be made that data has previously been written to the LBA. Accordingly, data of the failed first memory device being rebuilt in the second memory device may be allocated to the spare region (S33). That is, when rebuilding data in the second memory device, the RAID control module may calculate a hash value for the LBA of each of the non-failed, first memory devices (Disk 0, Disk 2 and Disk 3) using the second memory device (Spare Disk) and may further update the count table by increasing or decreasing a count in a bucket corresponding to the hash value (S35).

Figure 7:
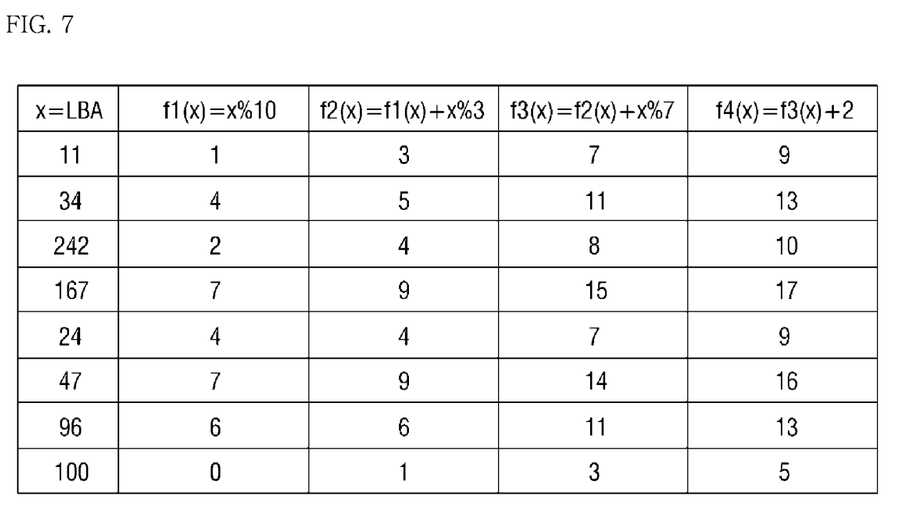
FIG. 7 is a table listing an exemplary hash modulation that may be performed by a RAID system according to embodiments of the inventive concept.

FIG. 7 is a table listing an example of a hash modulation that may be performed by a RAID system according to embodiments of the inventive concept.

Here, it is further assumed that data is stored in a first memory device (e.g., Disk 0) according to eight (8) constituent stripes. For example, it is assumed that in Disk 0 of FIG. 5 LBAs for rows of data chunks are 11, 34, 242, 167, 24, 47, 96, and 100, respectively.

It is also arbitrarily assumed that a hash modulation is performed four (4×) times on the LBA of each row. The hash modulation may be performed using different hash functions $f1(x)$ through $f4(x)$ as shown in the table. In some embodiments, the $f1(x)$ may produce the remainder of the LBA divided by 10 as a first hash value, $f2(x)$ may produce a value obtained by adding the remainder of the LBA divided by 3 to the first hash value as a second hash value, $f3(x)$ may produce a value obtained by adding the remainder of the LBA divided by 7 to the second hash value as a third hash value, and $f4(x)$ may produce a value obtained by adding 2 to the third hash value as a fourth hash value.

Hence, in the case of a first row, the first hash value is 1 because $f1(x)=11\%10=1$, the second hash value is 3 because $f2(x)=1+11\%3=1+2=3$, the third hash value is 7 because $f3(x)=3+11\%7=3+4=7$, and the fourth hash value is 9 because $f4(x)=7+2=9$, and in the case of a second row, the first hash value is 4 because $f1(x)=34\%10=4$, the second hash value is 5 because $f2(x)=4+34\%3=4+1=5$, the third hash value is 11 because $f3(x)=5+34\%7=5+6=11$, and the fourth hash value is 13 because $f4(x)=11+2=13$.

Likewise, the values of $f1(x)$ through $f4(x)$ may be calculated for each row to produce the first through fourth hash values as shown in each row of FIG. 7.

As for each hash value of each column, the first hash values are 1, 4, 2, 7, 4, 7, 6, and 0 in which 4 and 7 (i.e., two hash values) are redundant. However, the fourth hash values are 9, 13, 10, 17, 9, 16, 13, and 5 in which 13 (i.e., only one hash value) is redundant. If different hash functions are continuously applied as in the illustrated example, the number of redundant hash values in the same column (the same time) may be gradually reduced.

Figure 8:
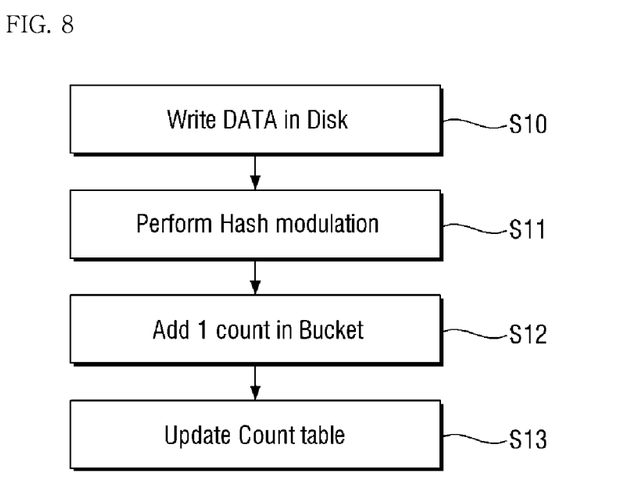
FIG. 8 is a flowchart summarizing in one example a method of updating a count table when data is written to a RAID system according to embodiments of the inventive concept.
Figure 9:
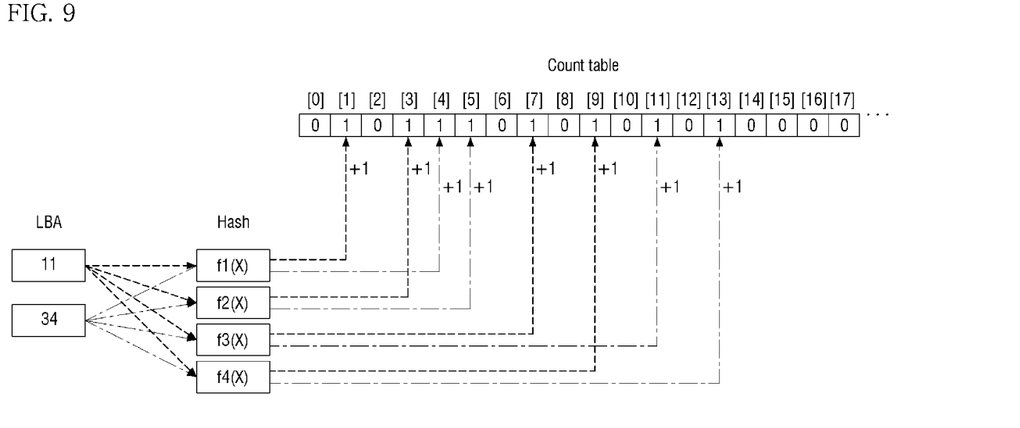
FIG. 9 is a conceptual diagram illustrating the use of a count table during the method of FIG. 8.
Figure 10:
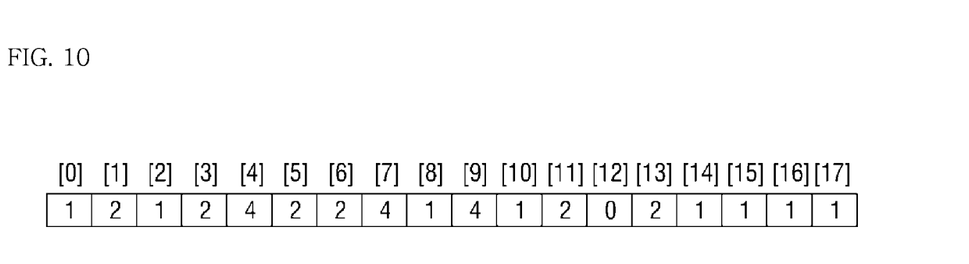
FIG. 10 is a conceptual diagram illustrating an exemplary count table that reflects the result of the hash modulation of FIG. 8.

FIG. 8 is a flowchart summarizing in one example a method of updating a count table when data is written to a RAID system according to embodiments of the inventive concept, FIG. 9 is a conceptual diagram further illustrating the method of FIG. 8, and FIG. 10 is an exemplary count table reflecting the result of hash modulation of FIG. 8.

Referring to FIG. 8, when a data chunk (DATA) is written to at least one the first memory devices (S10), an LBA corresponding to a used region of the first memory device to which the data chunk has been written has specific data. A RAID control module performs hash modulation on the LBA at least once (Si 1), and a resulting hash value calculated through the hash modulation increases a count (e.g., adds +1) at a corresponding bucket position in a count table by one (S12). And when the hash modulation is performed a number of times, the step of increasing the count at a bucket position corresponding to a hash value may be repeated to appropriately update the count table (S13).

Referring to FIGS. 7, 8 and 9, when the LBA is 11, the first through fourth hash values are 1, 3, 7 and 9, and when the LBA is 34, the first through fourth hash values are 4, 5, 11 and 13.

Thus, each hash value may correspond to positional information of a bucket in the count table. That is, whenever data is written to or discarded from a first memory device, the RAID control module may re-calculate a corresponding hash value and appropriately vary (increase or decrease) a count in a bucket corresponding to the hash value.

Extending the working example in this regard, when a data chunk or parity is written to the first row of the first memory device (Disk 0), the LBA of the first row has a specific value. If the LBA is 11, the first through fourth hash values may be calculated as 1, 3, 7, and 9, respectively, and the count table 400 or 500 may increase the count by one at bucket positions [1], [3], [7], and [9] corresponding to the first through fourth hash values.

Likewise, when a data chunk or parity is written to the second row of the first memory (Disk 0), if the LBA of the second row is 34, the first through fourth hash values may be calculated as 4, 5, 11, and 13. In this case, the count table 400 or 500 increases the count by one at bucket positions [4], [5], [11], and [13] corresponding to the first through fourth hash values.

Similarly, when data chunks or parity are written to the other rows (e.g., the third through eighth rows) of the first memory device (Disk 0), the first through fourth hash values may be calculated for the LBA (242, 167, 24, 47, 96, or 100) of each row as illustrated in FIG. 7. When the count in the count table 400 or 500 is increased by one at bucket positions corresponding to the calculated first through fourth hash values (f1(x) through f4(x)) of each row, the count table may be updated as illustrated in FIG. 10.

In some embodiments, the number of count tables may be equal to the number of first memory devices. In addition, a count table for a used region to which data has been written may be created for each of the first memory devices Disk 1 through Disk 3. Alternatively, in some other embodiments, since data associated with multiple first memory devices may be divided into data chunks and used after load balancing at the same ratio according to RAID configuration, the number of count tables may be less than the number of first memory devices.

The above example related to FIGS. 7, 8, 9, and 10 serve to illustrate hash modulation on any one first memory device (e.g., Disk 0) included in multiple memory devices in which data chunks and/or parity are used in a number of stripes (e.g., 8). However, this is merely an example and the number of stripes in the used region, the number of first memory devices, as well as the number of count tables may vary with design.

Figure 11:
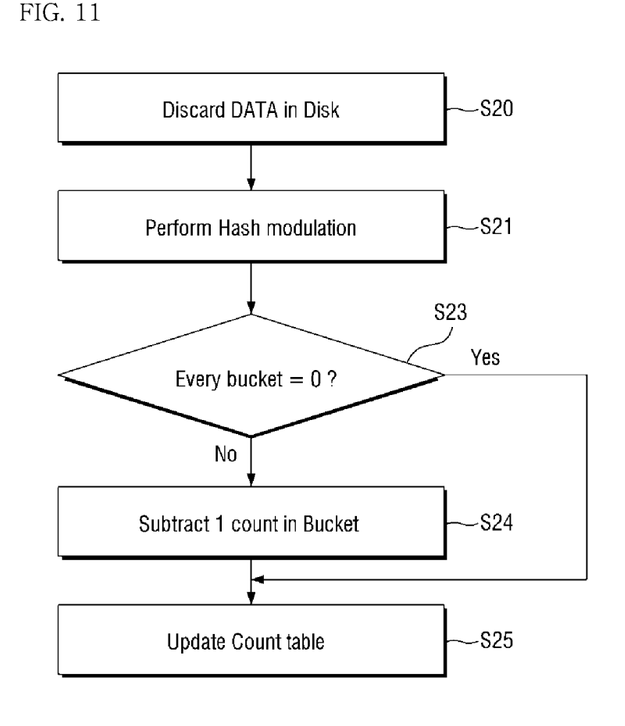
FIG. 11 is a flowchart summarizing in another example a method of updating a count table when data is discarded from a RAID system according to embodiments of the inventive concept.
Figure 12:
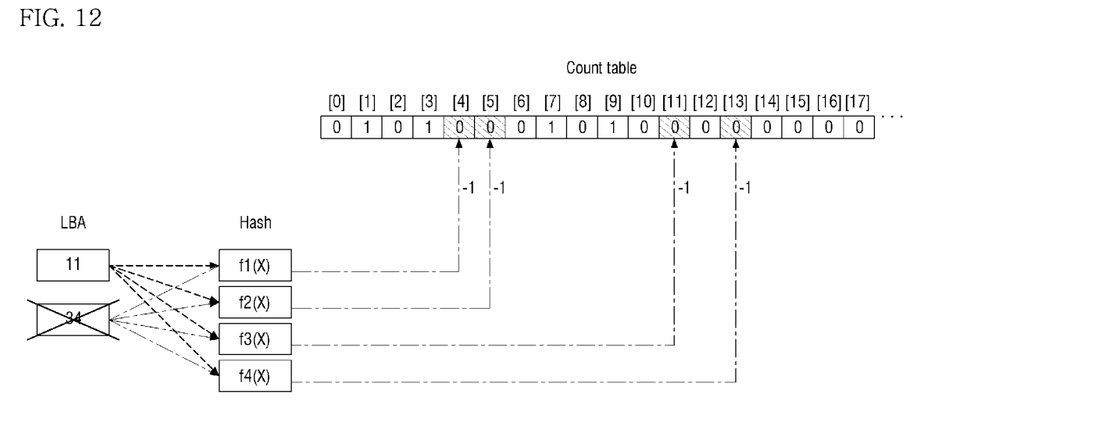
FIG. 12 is a conceptual diagram illustrating the use of a count table during the method of FIG. 10.

FIG. 11 is a flowchart summarizing in one example a method of updating a count table when data is discarded from a RAID system according to embodiments of the inventive concept, and FIG. 12 is a conceptual diagram illustrating the count table during the method of FIG. 11.

Referring to FIG. 11, when data chunks are discarded from at least one of the first memory devices (S20), used region(s) of the first memory device may be changed as a result. Therefore, the host device 100 or the RAID controller 200 may perform hash modulation on LBAs of the changed used region (S21). If buckets corresponding to all LBAs of the first memory device on which the hash modulation is performed have a count of zero (S23=YES), the first memory device may be identified as a first memory device which has never previously been used and the method may skip to the updating of the count table (S25). However, if at least one of the buckets corresponding to the LBAs of the first memory device on which the hash modulation is performed does not have a count of zero (S23=NO), the count of the count table may be varied (increased or decreased) by determining that a used region exists. That is, a hash value may be calculated through hash modulation for an LBA whose data state has been changed, and the count in a bucket at a position corresponding to the hash value in the count table is increased or decreased by one (S24). When the hash modulation is performed a plurality of times according to some embodiments, the RAID control module may calculate a hash value each time and update of the count table by repeating an operation of increasing or decreasing the count by one at a bucket position corresponding to each of the hash values of all times (S23).

Referring to FIGS. 8, 9 and 12, when the LBA is 11 in the illustrated embodiment, the first through fourth hash values are 1, 3, 7 and 9. When the LBA is 34, the first through fourth hash values are 4, 5, 11 and 13.

In the example illustrated in FIG. 9, when hash modulation is performed on the LBAs of the first row and the second row of a first memory device, buckets [0] through [17] in the count table 400 or 500 have a count of 010111010101010000.

If a data chunk stored in the second row of the first memory device is discarded, the first through fourth hash values for the LBA 34 of the second row should be subtracted from the previous count table. That is, when the LBA is 34, one is subtracted from buckets [4][5][11][13] corresponding to the first through fourth hash values 4, 5, 11 and 13.

In this manner, whenever data is discarded from a first memory device, the host 100 or the RAID controller 200 may check (or verify) the used region of the first memory device by updating the count table based on the LBA of a position from which the data has been discarded.

Figure 13:
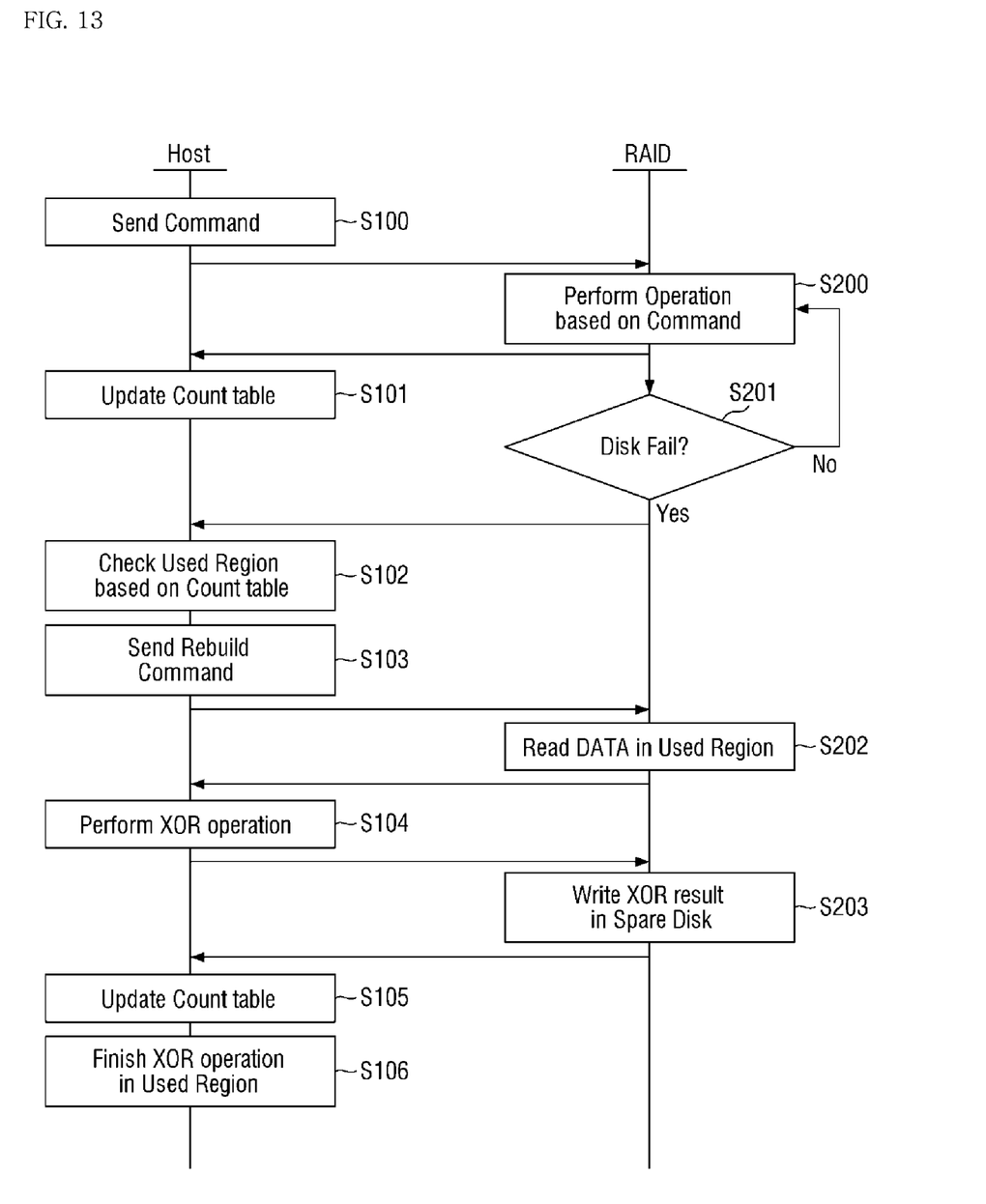
FIGS. 13 and 14 are respective flowcharts summarizing methods of operating a RAID system according to embodiments of the inventive concept.

FIG. 13 is a flowchart summarizing a method of operating a RAID system according to embodiments of the inventive concept.

Here, a host device may send a command for a RAID operation to the RAID system (S100). The RAID system may perform a RAID operation (e.g., a data read, data write, or data discard operation) as a foreground or a background operation on at least one of the first memory devices (S200), and the host device may update a count table for the at least one of the first memory devices by reflecting the result of the RAID operation (S101).

If at least one first memory device fails during the RAID operation (S201), the RAID system identifies the failed state of the first memory device to the host device. The host device than checks used regions of the first memory devices based on a last updated count table (S102) and sends a rebuild command to the RAID system based on the checked used regions (S103).

The RAID system reads data chunks or parity by accessing only the used regions of at least two first memory devices according to the rebuild command of the host device and sends the read data chunks or parity to the host device (S202), and the host device performs a rebuild operation on the read data chunks or parity (S104). For example, the rebuild operation may progress using an XOR operation.

When the host device sends the result of the operation to a second memory device in the RAID system, the second memory device may store (write) a received XOR operation value of each row in a corresponding row (S203).

Since the data storage state of the second memory device has been changed according to the result of the XOR operation, the host device updates the count table by performing hash modulation on an LBA based on the changed used region (S105). The count table may reflect, in real time, changes in the used regions of the first memory devices excluding the failed first memory device and a used region of the second memory device. When the XOR operation for the entire used regions is finished, the host device ends the rebuild operation (S106).

Figure 14:
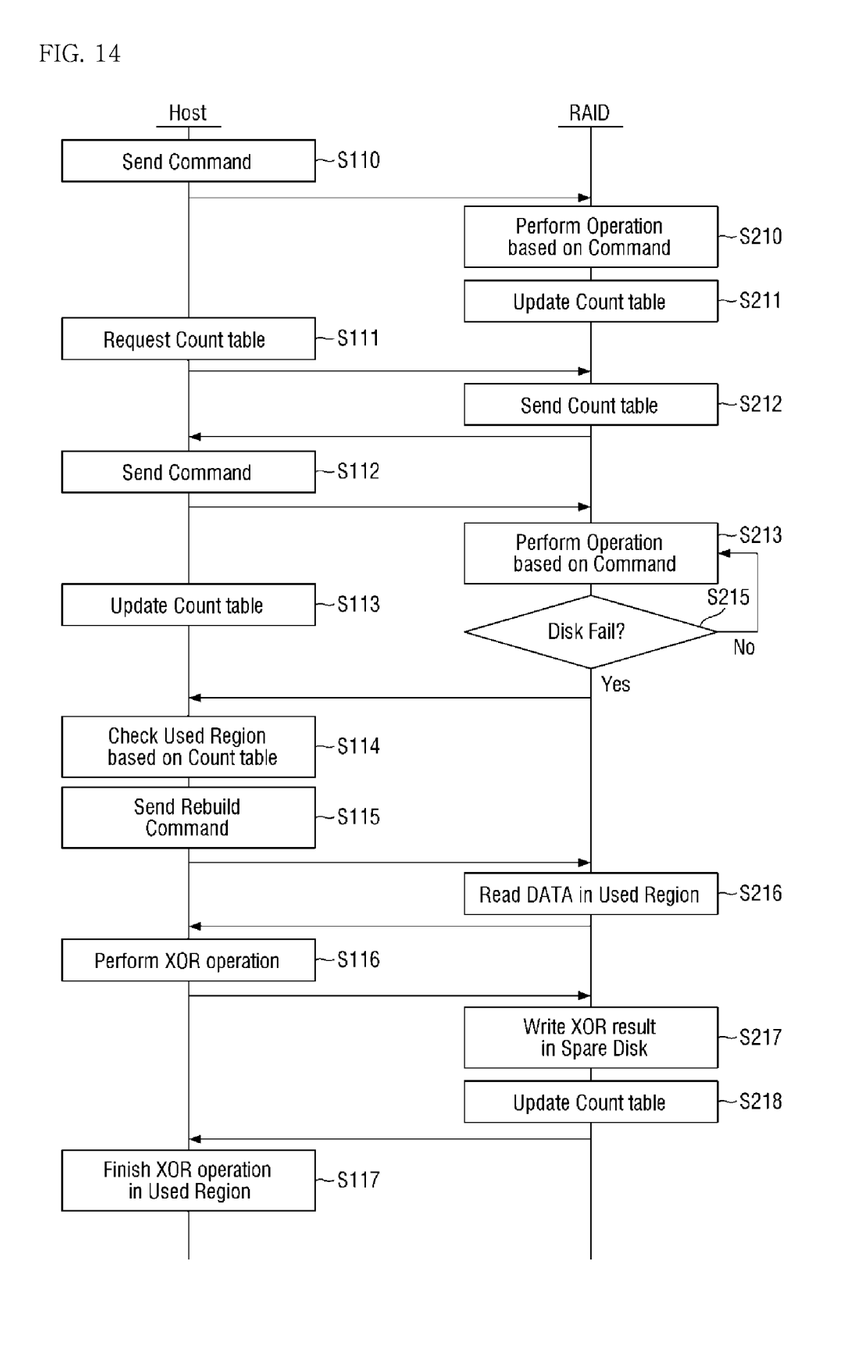

FIG. 14 is a flowchart summarizing illustrating a method of operating a RAID system according to embodiments of the inventive concept.

Referring to FIG. 14, a host device may send a command for a RAID operation to the RAID system (S110). The RAID system may perform a RAID operation (e.g., a data read, data write or data discard operation) as a foreground or a background operation on at least one of the first memory devices (S210) and update a count table for the at least one first memory device (S211).

In some embodiments, the host device may request the RAID system to send a count table according to a system setting or a user's instruction (S111). The RAID system may send a last updated count table to the host device according to the request (S212).

The host device may send a command for a RAID operation to the RAID system by referring to the count table received in operation S212 (S112). For example, the host device may send a read command by referring to the count table. The RAID system may perform a RAID operation according to the received command (S213), and the host device may continuously update the count table based on the operation result of the RAID system (S113). If at least one first memory device fails during the RAID operation (S215), the RAID system informs the host device of the failed state of the first memory device. The host device checks used regions of the first memory devices based on the last updated count table (S114) and sends a rebuild command for the checked used regions to the RAID system (S115).

The RAID system reads data chunks or parity by accessing only the used regions of at least two first memory devices according to the rebuild command previously received (S115) and sends the read data chunks or parity to the host device (S216), and the host device performs a rebuild operation on the read data chunks or parity (S116). For example, the rebuild operation may progress using an XOR operation.

When the host device sends the result of the operation to a second memory device in the RAID system, the second memory device may store (write) a received XOR operation value of each row in a corresponding row (S217).

According to some embodiment, the RAID system may update the count table by performing hash modulation on a used region of the second memory device after the result of the XOR operation (S218). Alternatively, according to some embodiments, the RAID system may update the count table by receiving, in real time or after the XOR operation, the count table updated (S113) and stored in the host device. Accordingly, the count table may reflect changes in the used regions of the first memory devices excluding the failed first memory device and the used region of the second memory device. When the XOR operation for the entire used regions is finished, the host device terminates the rebuild operation (S117).

Alternately, the host device may request the count table only when necessary instead of continuously updating the count table. Therefore, the host device may operate at low cost.

Figure 15:
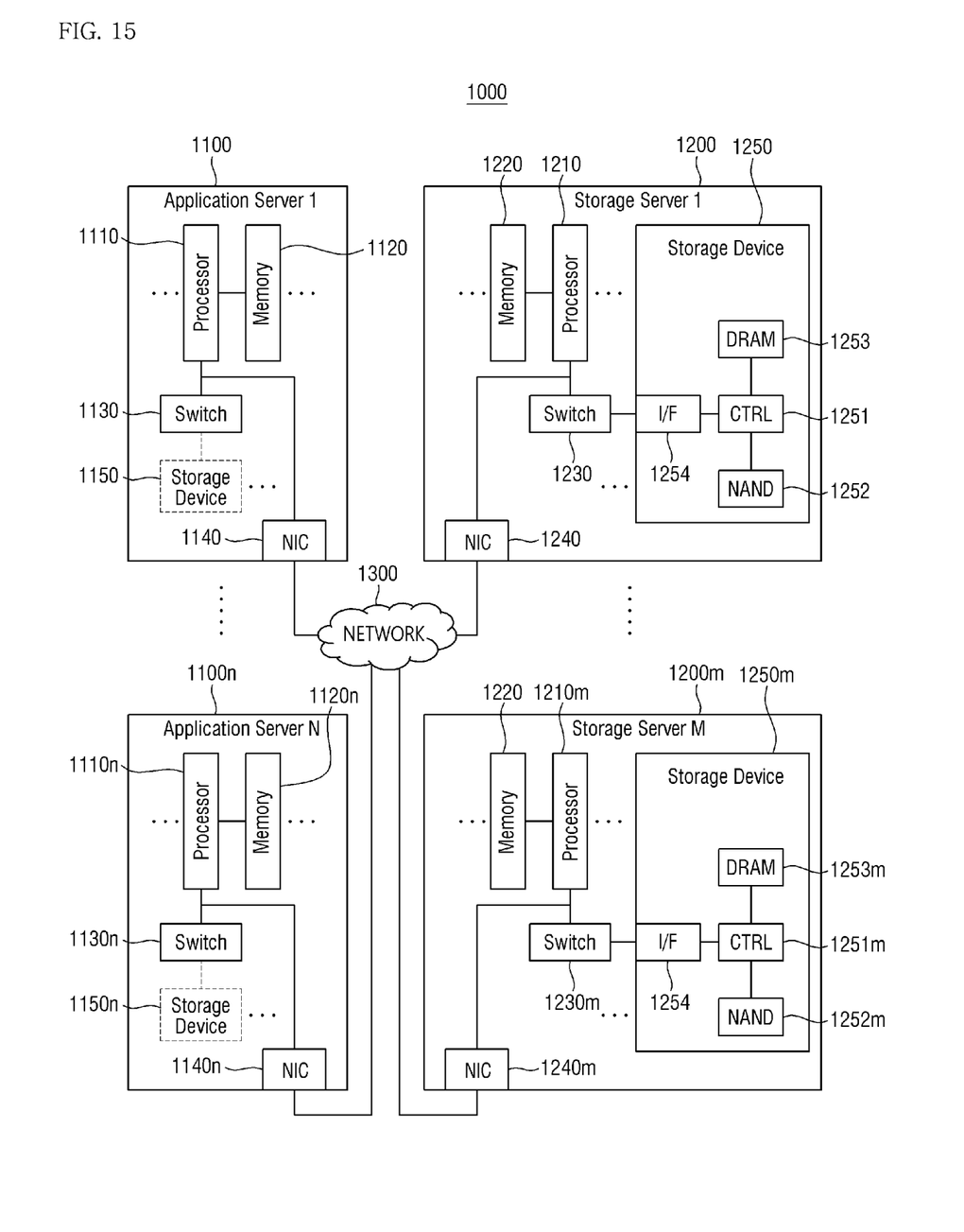
FIG. 15 is a block diagram illustrating a data center 1000 that may include a RAID storage device according to embodiments of the inventive concept.

FIG. 15 is a block diagram illustrating a data center 1000 that may include a RAID memory device according to embodiments of the inventive concept.

Referring to FIG. 15, the data center 1000 may be a facility that collects various data and provides services and may also be referred to as a data storage center. The data center 1000 may be a system for operating a search engine and a database and may be a computing system used by companies such as banks or government agencies. The data center 1000 may include application servers 1100 through 1100n and storage servers 1200 through 1200m. The number of application servers 1100 through 1100n and the number of storage servers 1200 through 1200m may be variously selected depending on embodiments. The number of application servers 1100 through 1100n may be different from the number of storage servers 1200 through 1200m.

The application server 1100 or the storage server 1200 may include at least one of a processor 1110 or 1210 and a memory 1120 or 1220. For example, in the case of the storage server 1200, the processor 1210 may control the overall operation of the storage server 1200 and access the memory 1220 to execute a command and/or data loaded in the memory 1220. According to some embodiments, the memory 1220 may include a count table. The memory 1220 may be a double data rate synchronous DRAM (DDR SDRAM), a high bandwidth memory (HBM), a hybrid memory cube (HMC), a dual in-line memory module (DIMM), an Optane DIMM, or a nonvolatile DIMM (NV[M]DIMM).

Depending on embodiments, the number of processors 1210 and the number of memories 1220 included in the storage server 1200 may be variously selected. In an embodiment, the processor 1210 and the memory 1220 may provide a processor-memory pair. In an embodiment, the number of processors 1210 may be different from the number of memories 1220. The processor 1210 may include a single-core processor or a multi-core processor. The above description of the storage server 1200 may be similarly applied to the application server 1100.

Depending on embodiments, the application server 1100 may not include a storage device 1150. The storage server 1200 may include one or more storage devices 1250. The number of storage devices 1250 included in the storage server 1200 may be variously selected depending on embodiments.

The application servers 1100 through 1100n and the storage servers 1200 through 1200m may communicate with each other through a network 1300. The network 1300 may be implemented using Fibre Channel (FC) or Ethernet. Here, the FC may be a medium used for relatively high-speed data transmission and may use an optical switch that provides high performance/high availability. The storage servers 1200 through 1200*m* may be provided as file storage, block storage, or object storage according to an access method of the network 1300.

In an embodiment, the network 1300 may be a storage dedicated network such as a storage area network (SAN). For example, the SAN may be an FC-SAN using an FC network and implemented according to an FC protocol (FCP). For another example, the SAN may be an IP-SAN using a TCP/IP network and implemented according to an SCSI over TCP/IP or Internet SCSI (iSCSI) protocol. In another embodiment, the network 1300 may be a general network such as a TCP/IP network. For example, the network 1300 may be implemented according to a protocol such as FC over Ethernet (FCoE), network attached storage (NAS), or NVMe over Fabrics (NVMe-oF).

The application server 1100 and the storage server 1200 will hereinafter be mainly described. The description of the application server 1100 may also be applied to another application server 1100*n*, and the description of the storage server 1200 may also be applied to another storage server 1200*m*.

The application server 1100 may store data requested to be stored by a user or a client in one of the storage servers 1200 through 1200*m* through the network 1300. In addition, the application server 1100 may obtain data requested to be read by a user or a client from one of the storage servers 1200 through 1200*m* through the network 1300.

For example, the application server 1100 may be implemented as a web server or a database management system (DBMS). The application server 1100 may be the host of FIG. 3 described according to some embodiments.

The application server 1100 may access a memory 1120*n* or a storage device 1150*n* included in another application server 1100*n* through the network 1300 or may access memories 1220 through 1220*m* or storage devices 1250 through 1250*m* included in the storage servers 1200 through 1200*m* through the network 1300. Accordingly, the application server 1100 can perform various operations on data stored in the application servers 1100 through 1100*n* and/or the storage servers 1200 through 1200*m*.

For example, the application server 1100 may execute a command for transferring or copying data between the application servers 1100 through 1100*n* and/or the storage servers 1200 through 1200*m*. Here, the data may be transferred from the storage devices 1250 through 1250*m* of the storage servers 1200 through 1200*m* to the memories 1120 through 1120*n* of the application servers 1100 through 1100*n* via the memories 1220 through 1220*m* of the storage servers 1200 through 1200*m* or directly. The data transferred through the network 1300 may be data encrypted for security or privacy.

For example, the application server 1100 may configure the application servers 1100 through 1100*n* and/or the storage servers 1200 through 1200*m* as a RAID. Thus, when any one server fails, the application server 1100 may execute a command for rebuilding data between the other application servers 1100 through 1100*n* and/or storage servers 1200 through 1200*m*. In this case, the application server 1100 may include a count table as metadata in the memory 1120 in an example or may request a count table from the other application servers 1100 through 1100*n* and/or storage servers 1200 through 1200*m* configured in the RAID to perform a rebuild operation.

In the storage server 1200, for example, an interface 1254 may provide a physical connection between the processor 1210 and a controller 1251 and a physical connection between an NIC 1240 and the controller 1251. For example, the interface 1254 may be implemented as a direct attached storage (DAS) interface that connects the storage device 1250 directly to a dedicated cable. In addition, for example, the interface 1254 may be implemented as various interfaces such as advanced technology attachment (ATA), serial-ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), compact flash (CF), and a card interface.

The storage server 1200 may further include a switch 1230 and the NIC 1240. The switch 1230 may selectively connect the processor 1210 and the storage device 1250 or may selectively connect the NIC 1240 and the storage device 1250 under the control of the processor 1210.

In an embodiment, the NIC 1240 may include a network interface card, a network adapter, or the like. The NIC 1240 may be connected to the network 1300 by a wired interface, a wireless interface, a Bluetooth interface, an optical interface, or the like. The NIC 1240 may include an internal memory, a digital signal processor (DSP), a host bus interface, etc. and may be connected to the processor 1210 and/or the switch 1230 through the host bus interface. The host bus interface may be implemented as one of the above-described examples of the interface 1254. In an embodiment, the NIC 1240 may be integrated with at least one of the processor 1210, the switch 1230, and the storage device 1250.

In some embodiments, the processor 1210, the memory 1220, the switch 1230, and the NIC 1240 may be included in the RAID controller 200 described in FIGS. 1 and 2 or in the host 100 described in FIGS. 3 and 4.

In a storage server (1200-1200*m*) or an application server (1100-1100*n*), a processor may send a command to a storage device (1150-1150*n*, 1250-1250*m*) or a memory (1120-1120*n*, 1220-1220*m*) to program or read data. Here, the data may be data that has been error-corrected through an error correction code (ECC) engine. The data may be data processed by data bus inversion (DBI) or data masking (DM) and may include cyclic redundancy code (CRC) information. The data may be data encrypted for security or privacy.

The storage device (1150-1150*n*, 1250-1250*m*) may send a control signal and a command/an address signal to a NAND flash memory device (1252-1252*m*) in response to the read command received from the processor. Accordingly, when data is read from the NAND flash memory device (1252-1252*m*), a read enable (RE) signal may be input as a data output control signal, causing the data to be output to a DQ bus. Data strobe (DQS) may be generated using the RE signal. The command and the address signal may be latched in a page buffer according to a rising edge or a falling edge of a write enable (WE) signal.

The controller 1251 may control the overall operation of the storage device 1250. In an embodiment, the controller 1251 may include an SRAM. The controller 1251 may write data to a NAND flash memory device 1252 in response to a write command or may read data from the NAND flash memory device 1252 in response to a read command. For example, the write command and/or the read command may be provided from the processor 1210 in the storage server 1200, a processor 1210*m* in another storage server 1200*m*, or processors 1110 and 1110*n* in the application servers 1100 and 1100*n*. A DRAM 1253 may temporarily store (buffer) data to be written to the NAND flash memory device 1252 or data read from the NAND flash memory device 1252. In addition, the DRAM 1253 may store metadata. Here, the metadata is user data or data generated by the controller 1251 to manage the NAND flash memory device 1252. The storage device 1250 may include a secure element (SE) for security or privacy. The metadata may include a count table according to some embodiments.

While the inventive concept has been particularly shown and described with reference to embodiments thereof, it will be understood that various changes in form and details may be made therein without departing from the spirit and scope of the following claims.

What is claimed is:

1. A redundant array of independent disks (RAID) storage device comprising:
    a memory device including first memory devices configured to store at least one of data chunks and corresponding parity and a second memory device configured to serve as a spare memory region; and
    a RAID controller including a RAID internal memory configured to store a count table and configured to control performing of a rebuild operation in response to a command received from a host,
    wherein upon identification of a failed first memory device from among the first memory devices, the RAID controller accesses only used regions of non-failed first memory devices based on the count table and rebuilds data of the failed first memory device using the second memory device,
    wherein the count table stores count table information indicating used regions in at least one of the first memory devices, and
    wherein in response to a RAID operation on the first memory devices, the RAID controller generates hash values by performing hash modulation based on a logical block address at which the at least one of the data chunks and the corresponding parity are stored, and stores in a plurality of buckets of the count table counts corresponding to a number of times the hash modulation is performed on the logical block address.

2. The RAID storage device of claim 1, wherein when the RAID operation is a write operation, the RAID controller increases in the count table the counts corresponding to a region of a first memory device from among the first memory devices to which the at least one of the data chunks and the corresponding parity are written.

3. The RAID storage device of claim 1, wherein when the RAID operation is a discard operation, the RAID controller reduces in the count table the counts corresponding to a region of a first memory device from among the first memory devices from which the at least one of the data chunks and the corresponding parity are discarded.

4. The RAID storage device of claim 1, wherein the RAID controller does not perform the rebuild operation when values of all counts in the buckets in the count table are zero.

5. A host device connected to nonvolatile memory devices including first memory devices configured to store at least one of data chunks and corresponding parity, and a second memory device configured to serve as a spare memory region, the host device comprising:
    a host internal memory configured to store a count table indicating used regions of each of the first memory devices; and
    a host processing unit configured to control a redundant array of independent disks (RAID) operation on the first memory devices and update the count table in response to the RAID operation, and further configured to control a rebuild operation on a failed first memory device among the first memory devices using the second memory device based on the count table,
    wherein the host processing unit generates a hash value by performing hash modulation based on a logical block address at which the at least one of the data chunks and the corresponding parity are stored in non-failed first memory devices of the first memory devices, and stores in a plurality of buckets of the count table counts corresponding to a number of times the hash modulation is performed on the logical block address.

6. The host device of claim 5, wherein when the RAID operation is a write operation, the host processing unit increases in the count table the counts corresponding to a first memory device region to which the at least one of the data chunks and the corresponding parity are written.

7. The host device of claim 5, wherein when the RAID operation is a discard operation, the host processing unit decreases in the count table the counts corresponding to a first memory device region from which the at least one of the data chunks and the corresponding parity are discarded.

8. The host device of claim 5, wherein the host processing unit begins the rebuild operation when the failed first memory device is identified, checks used regions of the non-failed first memory devices based on the count table, performs an XOR operation by reading data from the used regions of the non-failed first memory devices, and writes a result of the XOR operation to a region of the second memory device.

9. The host device of claim 8, wherein the host processing unit updates the count table based, in part, on the used regions of the first memory devices.

10. The host device of claim 8, wherein when values of all counts in the buckets of the count table are zero, the host processing unit ends the rebuild operation without performing the XOR operation.

11. A redundant array of independent disks (RAID) system comprising:
    a host and solid state drives connected to the host,
    wherein each one of the solid state drives comprises
        first memory devices configured as a RAID and further configured to store at least one of data and corresponding parity,
        a second memory device configured to serve as a spare memory device, and
        a memory controller configured to perform data access operations on the first memory devices and the second memory device,
    the RAID system storing a count table indicating used regions for each of the first memory devices, and
    upon identifying a failed first memory device from among the first memory devices, the RAID system accesses the at least one of the data and the corresponding parity in only used regions of non-failed first memory devices from among the first memory devices by referencing the count table to perform a rebuild operation on the failed first device using the second memory device,
    wherein the count table includes buckets indicating positional information for the used regions and unused regions for each of the first memory devices and the second memory device, and
    wherein the RAID system generates a hash value by performing hash modulation based on a logical block address of a used region for each of the non-failed first memory devices, and stores in respective buckets of the count table counts corresponding to a number of times the hash modulation is performed on the logical block address.

12. The RAID system of claim 11, wherein when the at least one of the data and the corresponding parity is written to a first memory device of the first memory devices, the count table is updated to increase count the counts in respective buckets corresponding to a position of the first memory device to which the at least one of the data and the corresponding parity is written.

13. The RAID system of claim 11, wherein when the at least one of the data and the corresponding parity is discarded from a first memory device of the first memory devices, the count table is updated to decrease the counts in respective buckets corresponding to a position of the first memory device from which the at least one of the data and the corresponding parity is discarded.

14. The RAID system of claim 11, wherein when the rebuild operation is performed, the counts in respective buckets corresponding to a position of a used region among the used regions in each of the non-failed first memory devices and the second memory device are changed.

15. The RAID system of claim 11, wherein the host comprises a host internal memory configured to store the count table that is updated whenever the at least one of the data and the corresponding parity is written to or discarded from the first memory devices.

* * * * *